United States Patent [19]
Nelson et al.

[11] Patent Number: 5,592,528
[45] Date of Patent: Jan. 7, 1997

[54] BATTERY CHARGING AND SIGNALLING INTERCONNECT ARRANGEMENT FOR CRAFTSPERSON'S PORTABLE SIGNAL PROCESSING AND COMMUNICATIONS UNIT

[75] Inventors: John R. Nelson, Leawood, Kans.; Gregory J. Pettit, Camarillo, Calif.; Tim G. Godfrey, Overland Park, Kans.; Wayne K. Wong, Camarillo, Calif.

[73] Assignee: Harris Corporation, Melbourne, Fla.

[21] Appl. No.: 339,906

[22] Filed: Nov. 14, 1994

[51] Int. Cl.$^6$ .............................. H04M 1/24; H04B 17/00; H01H 31/04; H01H 31/02
[52] U.S. Cl. .............................. 379/21; 379/29; 455/67.1; 324/538; 324/539
[58] Field of Search ................................. 379/1, 21, 27, 379/32, 34; 439/314, 320; 37/13; 455/67.1; 324/66, 538, 539

[56] References Cited

U.S. PATENT DOCUMENTS

| | | | |
|---|---|---|---|
| 4,837,488 | 6/1991 | Donahue | 379/21 X |
| 4,991,196 | 2/1991 | Krebs | 379/21 X |
| 5,170,114 | 12/1992 | Lowenstein et al. | 379/21 X |
| 5,377,259 | 12/1994 | Butler et al. | 379/21 X |
| 5,404,401 | 4/1995 | Bliven et al. | 379/27 X |
| 5,414,765 | 5/1995 | Lanquist et al. | 379/21 |

*Primary Examiner*—Wellington Chin
*Assistant Examiner*—Paul Loomis
*Attorney, Agent, or Firm*—Charles E. Wands

[57] ABSTRACT

To prevent entry of contaminants into a craft unit, each of a telephone signal connector (RJ11 jack) and DIN-type digital signalling link connector is replaced with a sealed, multi-pin plug/receptacle type connector which integrates the routing of both telephone communication signals and digital communication signals between the craft unit and an external device. When stored in a storage and battery-charging station, the craft unit is maintained in a communication-ready state, by providing each of the battery-charging holder and the portable craft unit with an additional multi-pin interconnect arrangement, that contains a charging path for the craft unit's internal battery, and a multi-pin signalling path. This multi-pin interconnect arrangement contains both a set of communication signalling pins and a set of terminal pins through which the internal battery of the portable craft unit is charged. Within a receiving cup-like portion of the storage and battery charging unit, a plurality of male connector pins are nested in a compact linear arrangement to engage a corresponding set of female connector terminals supported within the portable craft unit.

39 Claims, 6 Drawing Sheets

BATTERY CHARGING AND SIGNALLING INTERCONNECT ARRANGEMENT FOR CRAFTSPERSON'S PORTABLE SIGNAL PROCESSING AND COMMUNICATIONS UNIT

CROSS-REFERENCE TO RELATED APPLICATIONS

The present invention relates to subject matter disclosed in co-pending application Ser. No. 235,317 (hereinafter referenced as the '317 application), filed Apr. 29, 1994, entitled: "Telecommunication Test System Including a Test and Trouble Shooting Expert System," by K. R. Selig et al, assigned to the assignee of the present application, and the disclosure of which is herein incorporated.

FIELD OF THE INVENTION

The present invention relates in general to a telephone craftsperson's portable test signal processing and communication (craft) unit, and is particularly directed to a compact (hardware-efficient) storage and interconnect architecture, that not only provides a charging path for the craft unit's internal battery, but also includes a multi-pin signalling communication port that allows the craft unit to operated in an 'on-line' condition while being stowed in a battery-charging/holder. In addition, to this storage and interconnect architecture, the present invention is equipped with a sealed, multi-pin plug/receptacle connector through which telephone communication signals and/or digital communication signals may be interfaced between the craft unit and an external device, so as to prevent the introduction of contaminants into the unit.

BACKGROUND OF THE INVENTION

Figure 1:
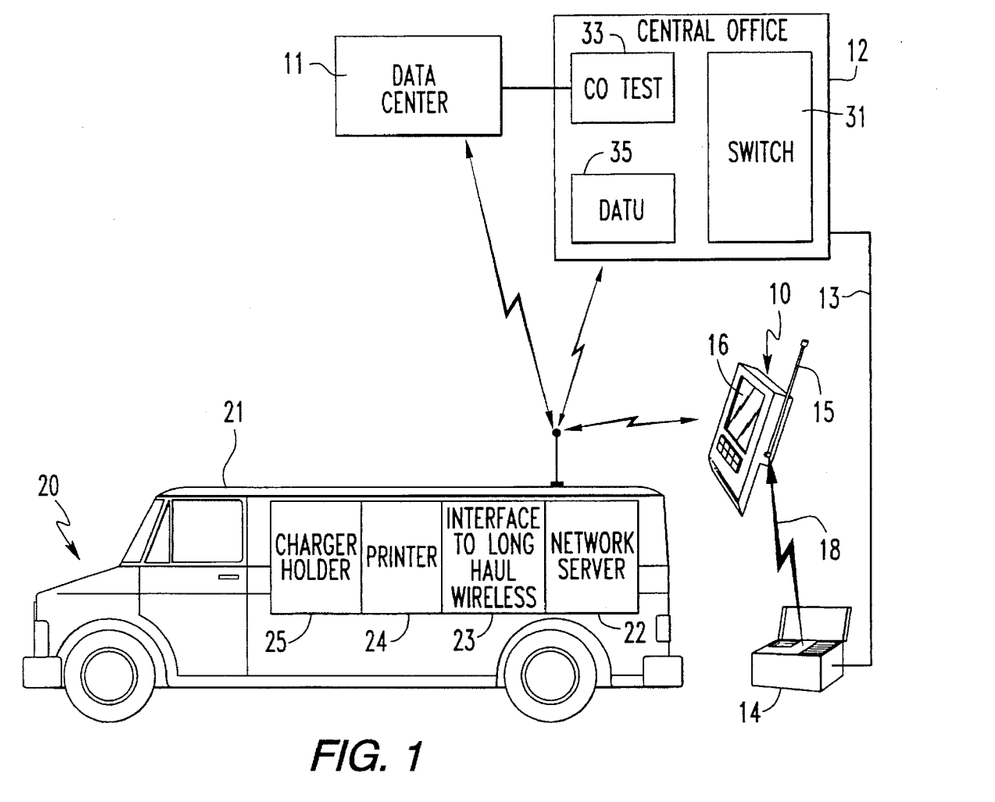
FIG. 1 diagrammatically illustrates a portable telecommunications test system described in the above-referenced co-pending '317 application.

The above-referenced co-pending '317 application describes a portable telecommunications test system, diagrammatically illustrated in FIG. 1 as comprising a hand-held personal computer-based test and communications craft unit 10, through which a craftsperson, who has been directed by a dispatch center 11 to a service site located remotely with respect to a central office 12 serving a line 13 to be tested, may communicate with the central office and with a generic test head 14 that is connectable to the line under test. To reach the service site, the craftsperson employs a technician's service vehicle 20.

As described in the '317 application, the test system functionality of the supervisory control mechanism executed by the internal processor of the craft unit 10 provides the service technician with a user-friendly, icon-based, test procedure for facilitating the craftsperson performance of various tests on the line. In so doing, the portable craft unit 10 is able to interact with multiple types of existing operational support systems.

For this purpose, via a contact-sensitive (e.g., pen touch-operated) video display panel 16 of hand-held craft unit 10, the craftsperson may selectively invoke one or more test operations represented by a set of analysis and test function-associated icons. In response to these selections, the internal control processor of craft unit 10 executes communication and signal processing operations associated with an identified test. The test head 14 proper performs data acquisition on demand from the computer within craft unit 10, including the execution of functional tests.

In order to communicate with a remote network facility (central office 12 or dispatch/data center 11), the craft unit 10 contains a transceiver interface, which is further interfaced with a communication and signal processing sub-system on board the technician's service vehicle 20. The communication and signal processing sub-system on board the van, in turn, links the craft unit 10 with the remote network facility, via either a short haul wireless link, or by way of an auxiliary back-up wireline link.

The central office facility 12 typically includes a central office switch 31, central office test devices 33, and a line-conditioning device 35, such as a direct access test unit (DATU), or (SASS) transmission conditioning system. The central office test devices 33 are capable of providing an interface with various operational support systems of the data center 11, such as a service vehicle dispatch, outside plant record database, automated testing systems, and electronic network schematics. The line-conditioning device (e.g. DATU or SASS) 35 within central office 12 provides the craftsperson with the ability to selectively conduct a number of tests of a line through the operation of either craft unit 10, or by invoking specified key combinations (sequences) from a standard craftsperson's telephone test set.

Within service van 20 is a battery-charging, communication and signal processing sub-system 21, that includes a network server 22, a long haul wireless interface 23, a printer 24, and a battery holder/charging station 25. The network server 22 contains a file server that provides additional processing power and electronic data storage, and performs auxiliary data processing tasks on demand from the craft unit 10. The long haul wireless interface 23 provides a wireless gateway to long haul wireless services. Printer 24 is available to print out various information, such as test results. Battery holder/charging station 24 receives and store the portable craft unit 10, so that unit 10 may be secured and stowed, and its associated power supply (battery pack) may be recharged, when not in use. (As will be described below, pursuant to a feature of the present invention, battery holder/charging station 24 is configured as a compact (hardware-efficient) storage and interconnect architecture, which includes a multi-pin signalling communication port that allows the craft unit 10 to operated in a hands-free 'on-line' condition while being stowed and charged in battery holder/charging station 24.)

Because craft unit 10 is portable and is intended to used in a variety of environments, it is necessary that it be sealed from the introduction of contaminants (e.g., moisture and foreign matter, or dust) which are a source of potential degradation of the operation of the circuit components housed within the craft unit. Unfortunately, conventional connectors that are normally employed for telephone signalling (such as a four lead RJ11 connector) and digital data signalling (such as an eight lead DIN connector) have no provision for preventing the exposure of their leads to contaminants or preventing the introduction of foreign matter into the interior of the housing or case to which they are mounted.

In a conventional test set configuration, efforts to circumvent the contaminant-based degradation problem have included coating printed circuit assemblies with non-conductive passivating materials, coating the electrical contacts of individual components with non-conductive adhesives, and enclosing the printed circuit assemblies within a permanently sealed module. However, these previous proposals have proven to be less than satisfactory. It has been found that coating the printed circuit assemblies is inadequate, since during the coating process, the coating material tends to pull away from the sharp points at the ends of the electrical contacts of circuit components, which leaves them exposed to contamination. Coating the electrical contacts has been not been found to provide consistently robust protection, due to inconsistencies in the coating application process, so that contaminants are not completely sealed out. Finally, placing the printed circuit assemblies inside a permanently sealed enclosure prevents repairs or retrofits without destroying the seal, which cannot be restored.

SUMMARY OF THE INVENTION

In accordance with a first feature of the present invention, the above-described contaminant-based degradation problem is effectively solved by replacing two unsealed connectors—a telephone signal connector (RJ11 jack) and a DIN-type digital signalling link connector, with a single, sealed, multi-pin plug/receptacle type connector which integrates the routing of telephone communication signals and/or digital communication signals between the craft unit and an external device.

Such a sealed, multi-pin plug/receptacle type connector may comprise a commercially available cylindrically configured connector, having a plurality of conductor pins embedded in a sealing material that does not permit contaminants (moisture and particulate matter) to pass through or around the conductor pins or between the conductor pins and the embedding material. The receptacle portion of the connector is mountable to the case or housing of the craft unit by means of a conformal washer that creates a seal at the connector-to-case interface. The mating plug portion of the connector is part of a cable assembly that distributes the telephone signals and/or the digital signals to an external device, such as a test head or communication sub-system within the technician's service vehicle, to which the other end of the cable is connected.

For this purpose, where the receptacle is interfaced with only a telephone signal port, so that the cable conveys only telephone signals, the far end of the cable may be terminated in a conventional telephone (e.g. RJ11) connector. Where the receptacle is interfaced with only a digital signalling port, so that the cable conveys only digital data communication signals, the far end of the cable may be terminated in conventional digital signal (e.g. DIN) connector. Where, the receptacle is ported for both telephone and digital signals, so that the cable conveys both telephone and digital data communication signals, the far end of the cable may be terminated in a Y-configuration, one arm of which may be terminated in a conventional telephone (e.g. RJ11) connector, and the other arm of which may be terminated in a conventional digital signal (e.g. DIN) connector.

Pursuant to a second aspect of the present invention, because the portable craft unit described in the above-referenced '317 application contains signal processing and communication capability not found in conventional test sets, it is desirable that, when not being used outside the service van, namely, when stowed in the above-referenced charging holder, the craft unit be in a communication-ready state. For this purpose, the present invention each of the battery-charging holder and the portable craft unit is configured to provide a compact (hardware-efficient) storage and interconnect architecture, that not only provides a charging path for the craft unit's internal battery, but also includes a multi-pin signalling communication port that allows the craft unit to placed in a hands-free, 'communication-ready' condition while being stowed in its charging unit.

This additional interconnect architecture contains both a set of communication signalling pins and a set of terminal pins through which the internal battery of the portable craft unit is charged. Within a cup-like receiving portion of the storage and battery charging unit, a plurality of male connector pins are nested in a compact linear arrangement to engage a corresponding set of female connector terminals supported within the portable craft unit.

The physical geometry of the cup-like receiving portion of the storage and charging unit is configured to conform with the bottom portion of the craft unit, so that when the craft unit is placed in the charger/holder, the signalling communication and charging pin arrangements of the craft unit and the charger/holder locate, align and mate with one another. Once so mated, this multi-purpose pin arrangement provides a charging current path from a charging power supply and a communication link to the service van's battery-charging, communication and signal processing sub-system. The charger/holder unit is also configured to receive and charge an additional or spare battery pack for the craft unit.

BRIEF DESCRIPTION OF THE DRAWINGS

FIGS. 5–10 show the details of plug and receptacle portions of a commercially available sealed, multi-pin plug/receptacle type connector assembly, in which

DETAILED DESCRIPTION

Figures 2, 3:
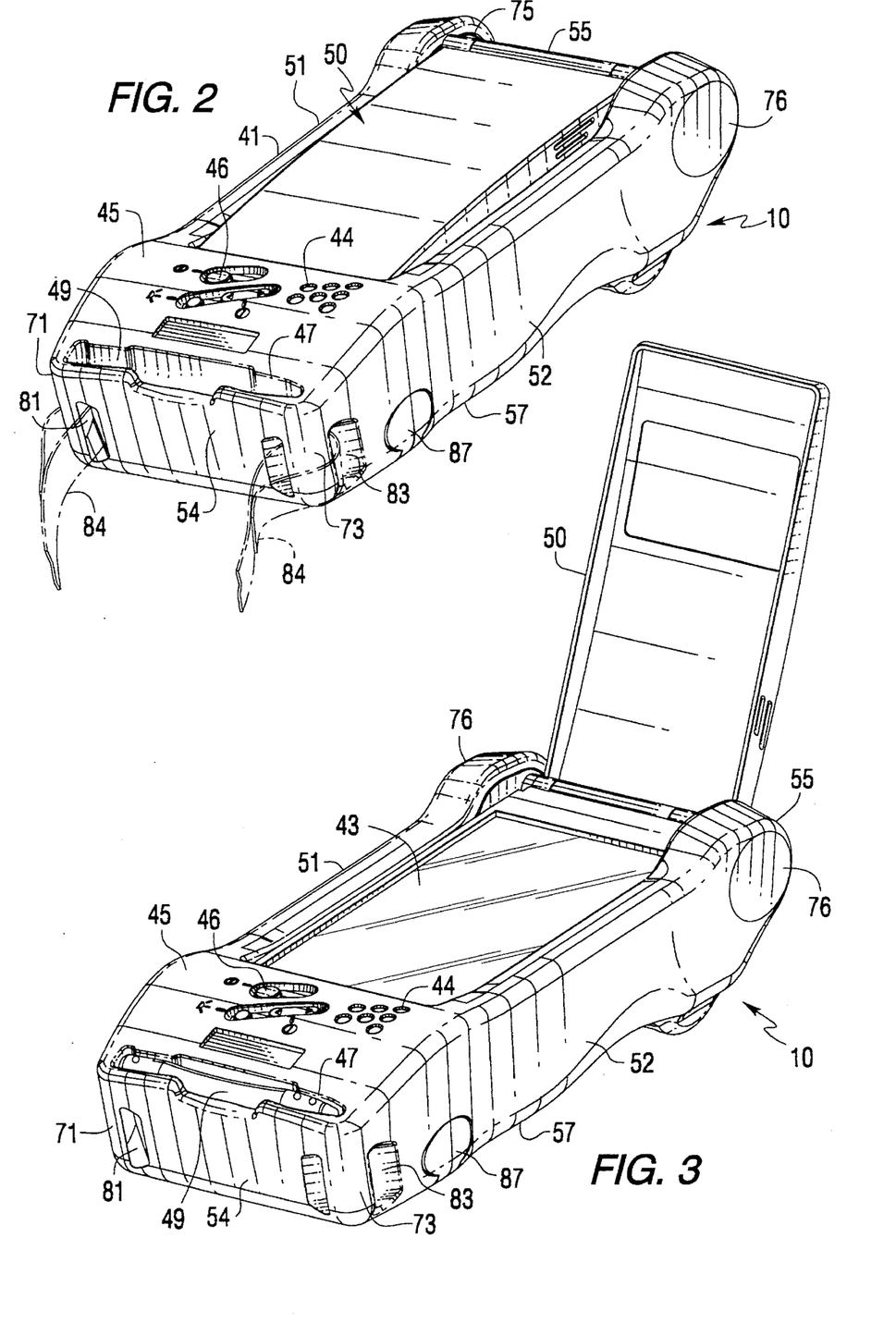
FIGS. 2, 3 and 4 are respective pictorial views of the housing configuration of a craft unit with its lid closed, open and fully extended.
Figure 4:
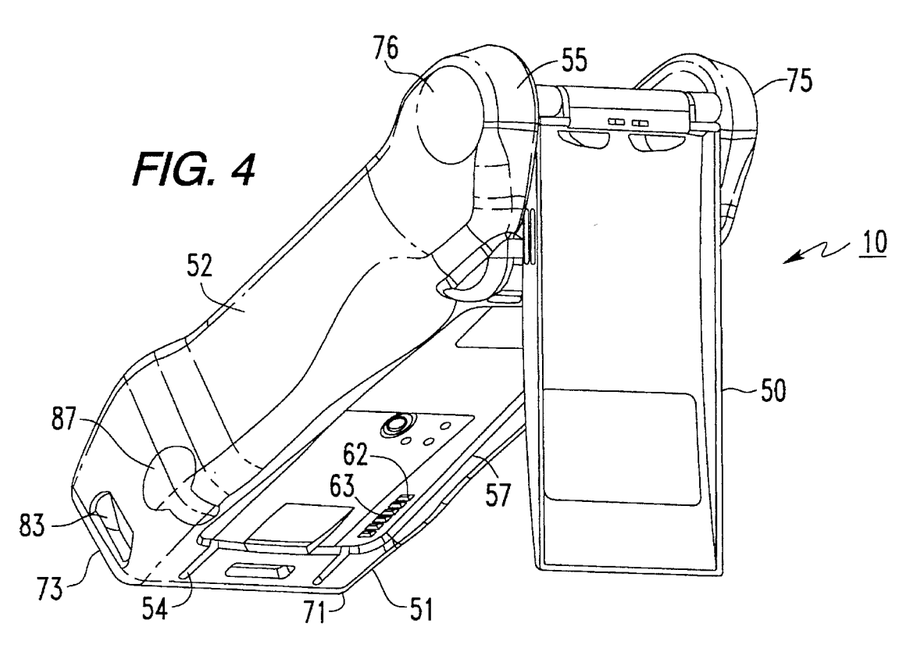

Attention is initially directed to FIGS. 2, 3 and 4, which are respective pictorial views of the housing configuration of the above-referenced craft unit with its lid closed, open and fully extended. As shown in these Figures, the craft unit 10 has a top portion 41 containing a display screen 43, such as an LCD screen, and an adjacent control element region 45. Display screen may be closed and protected by a pivotable lid 50. Control element region 45 may include one or more control buttons or switch elements 46 for operating the internal circuitry of the unit. Control element region may also include a depression or channel 47 in which a contact pen 49 may be captured, when not being used. Contact pen 49 may be employed by the craftsperson to touch or contact variously displayed icons or functional control buttons displayed on display screen 41, and thereby invoke specified operations associated with the displayed icons. Adjacent to control elements 46 are a plurality of audio apertures 44 beneath which an internal speaker is mounted.

Adjoining the top portion 41 of craft unit 10 are left and right side portions 51 and 52, a lower end portion 54 and an upper end portion 55. Each of these side and end portions further adjoins a bottom portion 57, which to contains a generally rectilinear arrangement 62 of recessed regions 63. This recessed region arrangement provides access to a multi-pin female terminal lead connector arrangement, the leads of which mate with corresponding male connector pins within a craft unit-receiving cup-like portion of the battery-charging and storage unit, as will be described. Left side portion 51 adjoins lower end portion 54 at corner region 71, while right side portion 52 adjoins lower end portion 54 at corner region 73. Each of these corner regions 71 and 73 has a respective passageway 81, 83 through which a support cord, such as a neck strap 84, may be secured.

Left side portion 51 adjoins upper end portion 55 at a left side lid pivot attachment 75, while right side portion 52 adjoins upper end portion 55 at a right side lid pivot attachment 76. These lid pivot attachments and the manner in which they enable the lid 50 to be securely positioned in the above-referenced closed, open and fully extended positions are detailed in co-pending application Ser. No. 08/343, 697, filed coincidently herewith, by John Nelson et al, entitled: "Multi-Attitude Display Lid Positioning Arrangement for Craftsperson's Portable Signal Processing and Communications Unit," assigned to the assignee of the present application and the disclosure of which is incorporated herein.

Disposed in right side portion 52 adjacent to corner region 73 of the craft unit is a connector receptacle port 87, which is configured to support a cylindrically configured, sealed, multi-pin receptacle (shown in detail in FIGS. 5–7, to be described), by way of which both telephone communication signals and digital communication signals may be routed, via an associated sealed, cylindrically configured, plug assembly (shown in FIGS. 8–10, to be described), between the craft unit 10 and an external device, such as test head 14.

Figures 5, 7:
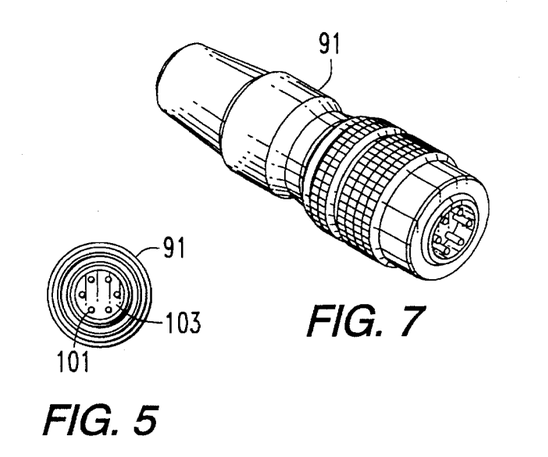
FIG. 5 is an end view the receptacle.
FIG. 7 shows a perspective view of the receptacle.
Figure 6:
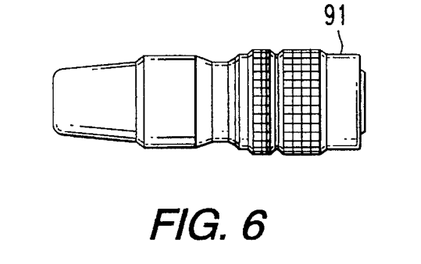
FIG. 6 is a side view of the receptacle.
Figure 8:
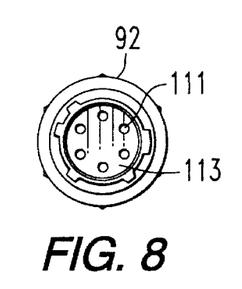
FIG. 8 is an end view of the plug with which the receptacle mates.
Figure 9:
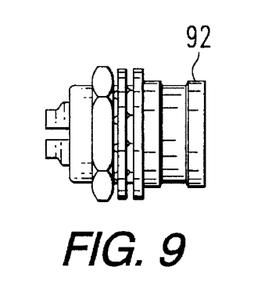
FIG. 9 is a side view of the plug.
Figure 10:
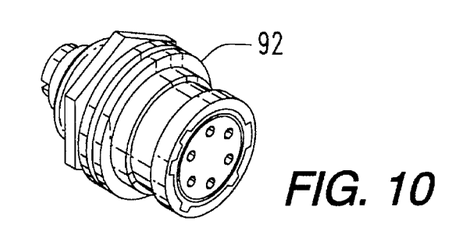
FIG. 10 is a perspective view of the plug.

In FIGS. 5–10, which show the details of plug and receptacle portions of a commercially available sealed, multi-pin plug/receptacle type connector assembly, FIG. 5 shows an end view of a sealed, multi-pin receptacle 91, FIG. 6 shows a side view of receptacle 91, and FIG. 7 shows a perspective view of receptacle. FIG. 8 shows an end view of a sealed, multi-pin plug 92 with which the receptacle 91 mates, FIG. 9 shows a side view of the plug 92, and FIG. 10 shows a perspective view of plug 92. The sealed, multi-pin plug/receptacle type connector assembly may comprise a receptacle and plug assembly manufactured by Hirose Electric Co. Ltd.

As illustrated in FIGS. 5–7, sealed receptacle 91 has a plurality of conductor pins 101 embedded in a sealing material 103 that does not permit contaminants (such as moisture and particulate matter) to pass through, around, or between the conductor pins 101 and the embedding material 103. Similarly, as shown in FIGS. 8–10, sealed plug 92 has a plurality of conductor terminals 111, that are arranged to be engaged by pins 101 of receptacle 91 and are embedded in a sealing medium 113. The receptacle portion 91 of the connector is mountable to the receptacle port 87 the right side portion 52 of craft unit 10 by means of a conformal washer that creates a seal at the connector-to-case interface.

Figure 11:
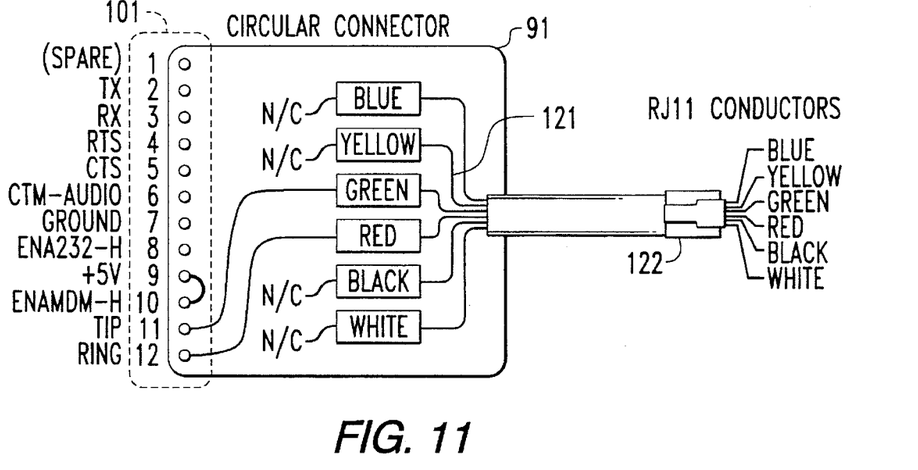
FIG. 11 diagrammatically illustrates the manner in the present invention may be employed to connect a set of four telephone signalling leads to four of an available twelve pins of the receptacle of FIGS. 5–7.

FIG. 11 diagrammatically illustrates the manner in which a set of four telephone signalling leads 121, that would customarily be terminated via an RJ11 connector installed in the craft case, are coupled to some of the (twelve) pins 101 of the connector receptacle 91. In the non-limiting illustrated example, pins 11 and 12 of the connector receptacle 91 are shown as being coupled to the Tip and Ring leads of the telephone signal interface. Pin 10 is a select or enable lead (ENAMDM-H), which is pulled high by a jumper or strap to a +5 V lead to which pin 9 is connected. By pulling up pin 10 to +5 V, detection circuitry within the craft unit recognizes that the signalling leads 121 are ported to a telephone line connector (e.g. an RJ11 connector) 122 at the far end of the cable.

Figure 12:
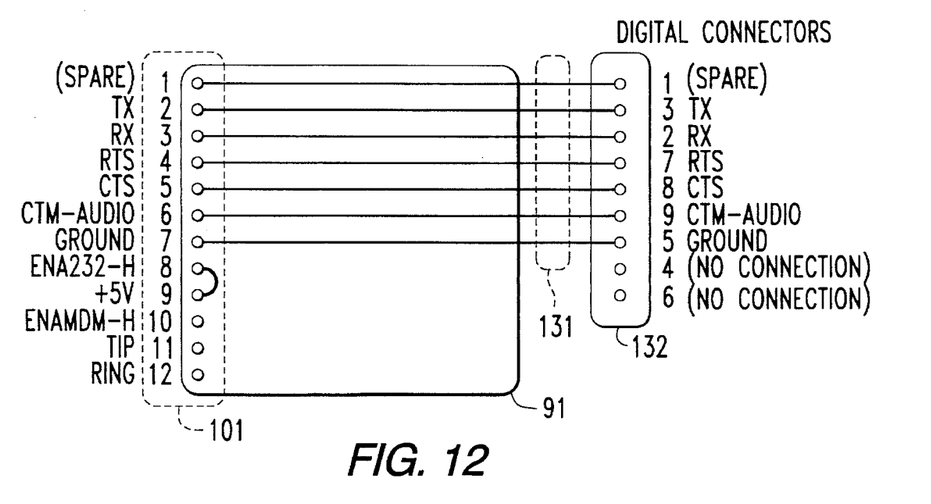
FIG. 12 diagrammatically illustrates the manner in which the present invention may be employed to connect a set of eight telephone digital (serial) communication signalling leads to the remaining eight of the available twelve pins of the receptacle of FIGS. 5–7.

Similarly, FIG. 12 diagrammatically illustrates the manner in which a set of telephone digital (serial) communication signalling leads 131, that would otherwise be terminated via an eight lead RS232 DIN connector installed in the craft unit, are coupled to others of the (twelve) available pins 101 of the connector receptacle 91. In the non-limiting illustrated example, pin 1 is a spare pin, while pins 2–7 of the connector receptacle 91 are shown as being coupled to various signalling leads of the digital communication signal interface. Pin 8 is a select or enable lead (ENA232-H), which is pulled high by a jumper or strap to a +5 V lead to which pin 9 is connected. By pulling up pin 8 to +5 V, detection circuitry within the craft unit recognizes that the signalling leads are ported to a digital communications connector (e.g. a DIN connector) 132 at the far end of the cable.

Figure 16:
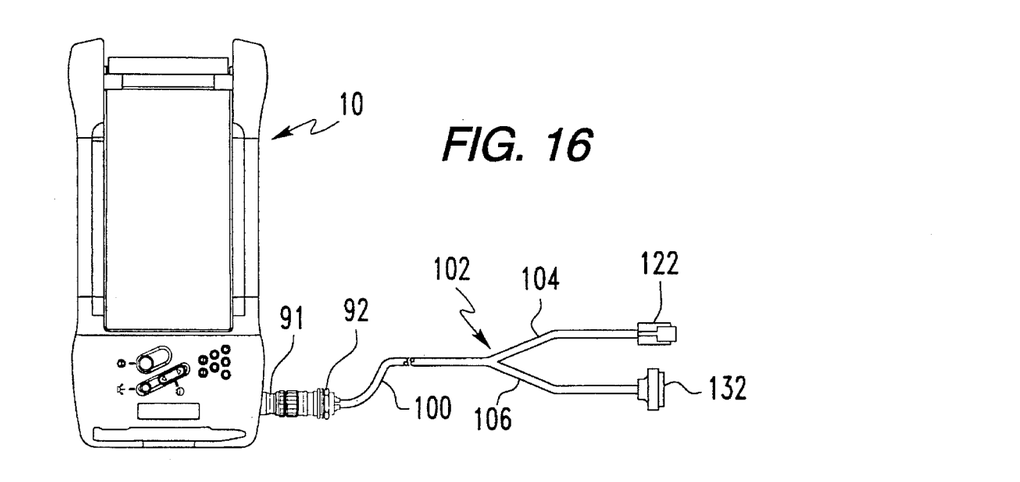
FIG. 16 diagrammatically illustrates a dual signal-conveying cable, one of which is ported to a sealed, multi-pin plug/receptacle type connector assembly, and the other end of which has a Y-termination for porting both telephone and digital signals conveyed by the cable.

In addition to porting the sealed connector assembly to either telephone signalling leads, per se, or digital communication signalling leads, per se, the connector receptacle 91 may be ported for both telephone and digital signals, as diagrammatically illustrated in FIG. 16, so that a dual signal interconnect cable 100 may convey both telephone and digital data communication signals. Cable 100 has its craft end ported via plug 92 to receptacle 91, and its far end terminated in a Y-configuration 102, one arm 104 of which may be terminated in a conventional telephone (e.g. RJ11) connector 122, to which leads 121 of FIG. 11 are connected, and the other arm 106 of which may be terminated in a conventional digital signal (e.g. DIN) connector 132, to which the leads 131 of FIG. 12 are connected.

By integrating the routing of telephone communication signals and/or digital communication signals in a sealed, cylindrical receptacle and plug assembly, as described above, the present invention remedies the lack of provision in either of the RJ11 and DIN connectors to prevent their leads from being exposed to contaminants or to prevent the introduction of foreign matter into the interior of the device to which they are mounted.

As mentioned previously, the battery-charging, communication and signal processing sub-system within the craftspersons' service vehicle includes a battery holder/charging station, which is operative to receive and securely store craft unit 10, so that unit's internal battery pack may be recharged, when not in use. Pursuant to a second feature of the present invention, the battery holder/charging station is configured in the manner diagrammatically illustrated at 140 in FIGS. 13 and 14 to include a multi-pin signalling communication port 141 that allows the craft unit 10 to operated in a hands-free, 'on-line' condition while being stowed and charged.

Figure 13:
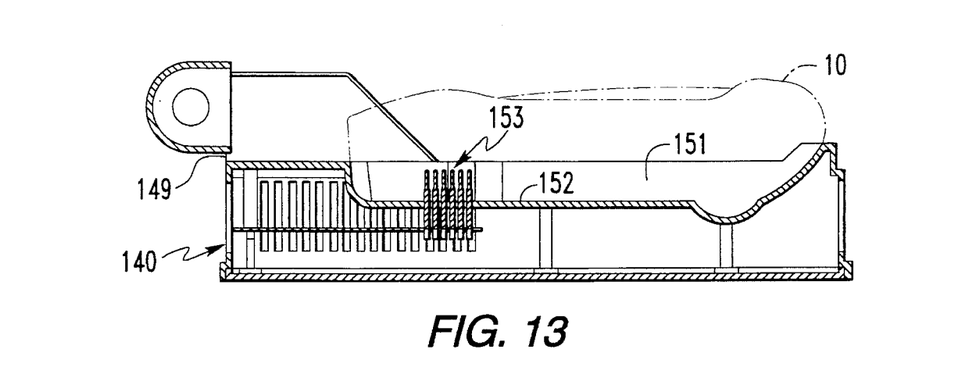
FIGS. 13, 14 and 15 are respective diagrammatic side, top and perspective views of a battery holder/charging station in accordance with the present invention.
Figure 14:
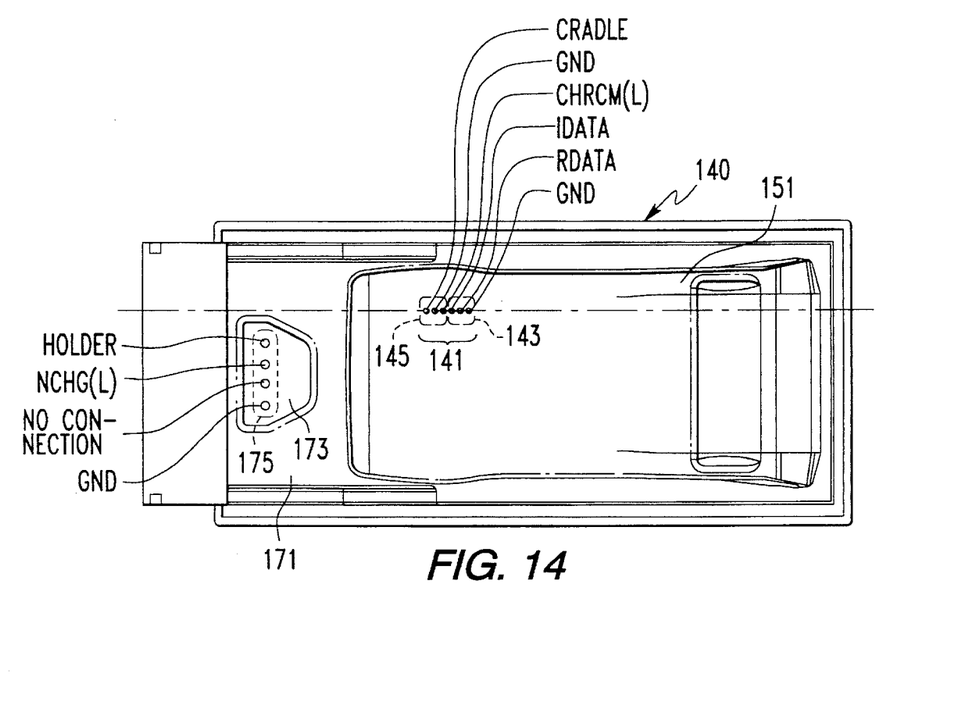
Figure 15:
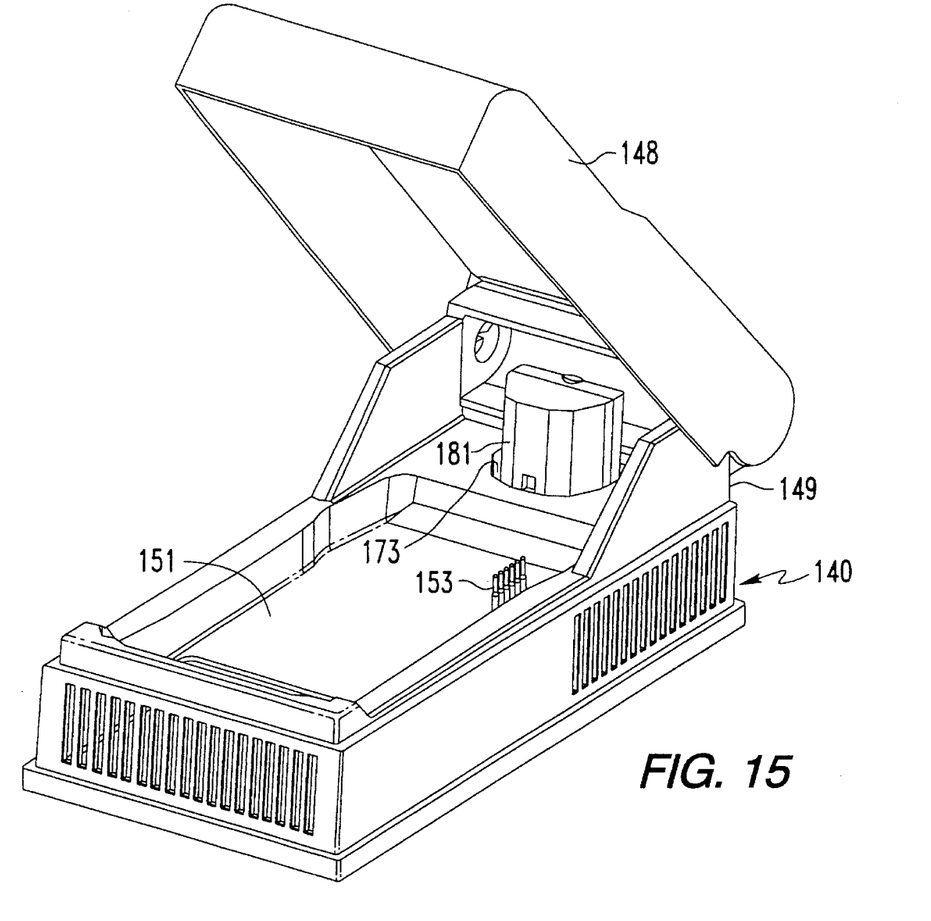

As shown in FIGS. 13, 14 and 15, the multi-pin signalling communication port 141 of a storage and charging station 140 contains both a set of communication signalling pins 143 and a set of battery-charging terminal pins 145 through which the internal battery pack of the portable craft unit 10 is charged. The charging station 140 includes cup-like receiving portion 151, in which a plurality of male connector pins 153 are nested in a compact linear arrangement to engage the above-referenced arrangement of female connector terminals 62 supported within the recessed regions 63 of portable craft unit 10. A protective lid closure 148 is hinged at a rear portion 149 of storage and charging station 140.

As can be seen in FIGS. 2, 3, 13, 14 and 15, the physical geometry of the cup-like receiving portion 151 of battery charging and storage station 140 is shaped to conform with the bottom portion 57 of the craft unit. As a result, when the craft unit is placed in the charger/holder unit 140, the respective male pins of the signalling communication and charging pin arrangement 153, which project vertically through a floor portion 152 of cup-like receiving portion serve to locate, align and make contact with respective ones of the linear arrangement of female connector terminals 62 supported within the recessed regions 63 of the craft unit. Once mated, this multi-purpose pin arrangement provides both a charging current path from a charging power supply to which holder and charging station 140 is connected, and a communication link to the service van's long haul wireless interface employed for the above-described wireless services.

As further illustrated in FIGS. 14 and 15, a rear portion 171 of charger/holder unit 140 has a battery charging well 173 having a plurality of terminals 175, which serve to retain and charge a spare craft unit battery pack 181 that may be inserted into charging well 173.

As will be appreciated from the foregoing description, the compact battery storage and charging station feature of the present invention not only enables the craft unit's battery pack to be charged, when not being used outside the service van, but provides a communication signalling path for digital communication signals (e.g. RS-232 signals), so that the craft unit may be maintained in a communication-ready state while being stowed in the charging unit.

While we have shown and described several embodiments in accordance with the present invention, it is to be understood that the same is not limited thereto but is susceptible to numerous changes and modifications as known to a person skilled in the art, and we therefore do not wish to be limited to the details shown and described herein but intend to cover all such changes and modifications as are obvious to one of ordinary skill in the art.

What is claimed:

1. A method of providing an electrical interface for a craftsperson's signal processing and communications craft unit through which a craftsperson, who may be dispatched to a service site that is remotely located with respect to a telephone facility serving a subscriber line, may conduct telephone and digital communication signalling with a test system of said telephone facility and with a test head that is connectable to said subscriber line, said craft unit having telephone signalling leads and communication signalling leads, said method comprising the steps of:

(a) mounting to said craft unit a multi-conductor sealed connector that is configured to prevent the entry of contaminants thereinto and into said craft unit; and (b) interconnecting respective ones of either or both of said telephone signalling leads and said communication signalling leads to respective conductors of said multi-conductor sealed connector.

2. A method according to claim 1, where said multi-conductor sealed connector comprises a multi-pin cylindrically configured receptacle-type connector.

3. A method according to claim 1, further including the steps of:

(c) providing an electrical interconnect cable having a plurality of leads therein, with a first end of said cable having a multi-conductor sealed connector that is complementary to the connector provided in step (a); and (d) mating the complementary multi-conductor sealed connector provided in step (c) to the connector provided in step (a), whereby respective ones of either or both of said telephone signalling leads and said communication signalling leads of said craft unit are electrically connected to respective ones of said plurality of leads of said electrical interconnect cable, while being sealed against the intrusion of contaminants.

4. A method according to claim 3, wherein one of the multi-conductor sealed connector provided in step (a) and the complementary multi-conductor sealed connector provided in step (c) comprises a multi-pin cylindrically configured receptacle-type connector, and the other of the multi-conductor sealed connector provided in step (a) and the complementary multi-conductor sealed connector provided in step (c) comprises a multi-pin cylindrically configured plug-type connector.

5. A method according to claim 1, wherein said craft unit includes a rechargeable battery and charging leads therefor, and further including the step of:

(c) mounting to said craft unit an additional multi-conductor connector, said additional multi-conductor connector including a first set of connector terminals to which said charging leads are connected, and a second set of connector terminals to which communication signalling leads are connected.

6. A method according to claim 5, wherein said craft unit is configured to be coupled with a storage and charging station having an arrangement of battery charging terminals and communication signal terminals, and wherein step (c) comprises mounting said additional multi-conductor connector at a location on said craft unit, such that said first and second sets of connector terminals of said additional multi-conductor connector are aligned with and engage said arrangement of battery charging terminals and communication signal terminals, when said craft unit is coupled with said storage and charging station.

7. A method according to claim 6, wherein said storage and charging station has a generally cup-like receiving portion, in which said arrangement of battery charging terminals and communication signal terminals is provided, and wherein step (c) comprises mounting said additional multi-conductor connector at a bottom portion of said craft unit, such that said first and second sets of connector terminals of said additional multi-conductor connector are aligned with and engage said arrangement of battery charging terminals and communication signal terminals, when said craft unit is placed into said generally cup-like receiving portion of said storage and charging station.

8. A method of providing an electrical interface for a craftsperson's signal processing and communications craft unit through which a craftsperson, who may be dispatched to a service site that is remotely located with respect to a telephone facility serving a subscriber line, may conduct telephone and communication signalling with a test system of said telephone facility and with a test head that is connectable to said subscriber line, said craft unit having a rechargeable battery and charging leads therefor and communication signalling leads, said method comprising the steps of:

(a) mounting to said craft unit a multi-conductor connector; and (b) connecting a first set of connector terminals of said multi-conductor connector to said charging leads, and connecting a second set of connector terminals of said multi-conductor connector to said communication signalling leads.

9. A method according to claim 8, wherein said craft unit is configured to be coupled with a storage and charging station having an arrangement of battery charging terminals and communication signal terminals, and wherein step (a) comprises mounting said multi-conductor connector at a location on said craft unit, such that said first and second sets of connector terminals of said multi-conductor connector are aligned with and engage said arrangement of battery charging terminals and communication signal terminals, when said craft unit is coupled with said storage and charging station.

10. A method according to claim 9, wherein said storage and charging station has a generally cup-like receiving portion, in which said arrangement of battery charging terminals and communication signal terminals is provided, and wherein step (a) comprises mounting said multi-conductor connector at a bottom portion of said craft unit, such that said first and second sets of connector terminals of said multi-conductor connector are aligned with and engage said arrangement of battery charging terminals and communication signal terminals, when said craft unit is placed into said generally cup-like receiving portion of said storage and charging station.

11. An electrical interface for a craftsperson's signal processing and communications craft unit, said craft unit being operative to enable a craftsperson, who may be dispatched to a service site that is remotely located with respect to a telephone facility serving a subscriber line, to conduct telephone and communication signalling with a test system of said telephone facility and with a test head that is connectable to said subscriber line, said craft unit having telephone signalling leads and communication signalling leads, said electrical interface comprising:

a multi-conductor sealed connector mounted to said craft unit and being configured to prevent the entry of contaminants thereinto and into said craft unit; and interconnections from respective ones of either or both of said telephone signalling leads and said communication signalling leads of said craft unit to respective conductors of said multi-conductor sealed connector.

12. An electrical interface according to claim 11, where said multi-conductor sealed connector comprises a multi-pin cylindrically configured receptacle-type connector.

13. An electrical interface according to claim 11, further including an electrical interconnect cable having a plurality of leads therein, with a first end of said cable having a multi-conductor sealed connector that is complementary to and mated with the connector mounted to said craft unit, so that respective ones of either or both of said telephone signalling leads and said communication signalling leads of said craft unit are electrically connected to respective ones of said plurality of leads of said electrical interconnect cable, while being sealed against the intrusion of contaminants.

14. An electrical interface according to claim 13, wherein one of the multi-conductor sealed connector mounted to said craft unit and said complementary multi-conductor sealed connector comprises a sealed, multi-pin cylindrically configured receptacle-type connector, and the other of the multi-conductor sealed connector mounted to said craft unit and said complementary multi-conductor sealed connector comprises a sealed multi-pin cylindrically configured plug-type connector.

15. An electrical interface according to claim 11, wherein said craft unit includes a rechargeable battery and charging leads therefor, and further including an additional multi-conductor connector mounted to said craft unit, said additional multi-conductor connector including a first set of connector terminals to which said charging leads are connected, and a second set of connector terminals to which communication signalling leads are connected.

16. An electrical interface according to claim 15, wherein said craft unit is configured to be coupled with a storage and charging station having an arrangement of battery charging terminals and communication signal terminals, and wherein said additional multi-conductor connector is mounted at a location on said craft unit, such that said first and second sets of connector terminals of said additional multi-conductor connector are aligned with and engage said arrangement of battery charging terminals and communication signal terminals, when said craft unit is coupled with said storage and charging station.

17. An electrical interface according to claim 16, wherein said storage and charging station has a generally cup-like receiving portion, in which said arrangement of battery charging terminals and communication signal terminals is provided, and wherein said additional multi-conductor connector is mounted at a bottom portion of said craft unit, such that said first and second sets of connector terminals of said additional multi-conductor connector are aligned with and engage said arrangement of battery charging terminals and communication signal terminals, when said craft unit is placed into said generally cup-like receiving portion of said storage and charging station.

18. An electrical interface according to claim 11, wherein said multi-conductor sealed connector comprises a sealed, cylindrically configured, multi-pin receptacle type connector mounted to a connector receptacle port at a side portion of said craft unit, respective pins of said cylindrically configured, sealed, multi-pin receptacle being connected to leads by way of which both telephone communication signals and communication signals are routed therethrough.

19. An electrical interface according to claim 14, wherein said multi-conductor sealed connector comprises a sealed, cylindrically configured, multi-pin receptacle type connector mounted to a connector receptacle port at a side portion of said craft unit, respective pins of said cylindrically configured, sealed, multi-pin receptacle being connected to leads by way of which either or both of telephone communication signals and communication signals are routed therethrough.

20. An electrical interface according to claim 19, wherein said sealed, cylindrically configured, multi-pin receptacle-type connector includes a plurality of conductor pins embedded in a sealing material that prevents contaminants such as moisture and particulate matter from passing through, around, or between said conductor pins and said sealing material, and wherein said complementary connector comprises a sealed, cylindrically configured, multi-pin plug-type connector that contains a plurality of conductor leads embedded in a sealing material that prevents contaminants such as moisture and particulate matter from passing through, around, or between said conductor leads and said sealing material.

21. An electrical interface for a craftsperson's signal processing and communications craft unit, said craft unit being operative to enable a craftsperson, who may be dispatched to a service site that is remotely located with respect to a telephone facility serving a subscriber line, to conduct telephone and communication signalling with a test system of said telephone facility and with a test head that is connectable to said subscriber line, said craft unit having a rechargeable battery and charging leads therefor and communication signalling leads, said electrical interface comprising:

a multi-conductor connector mounted to said craft unit; and electrical interconnections from a first set of connector terminals of said multi-conductor connector to said charging leads, and from a second set of connector terminals of said multi-conductor connector to said communication signalling leads.

22. An electrical interface according to claim 21, wherein said craft unit is configured to be coupled with a storage and charging station having an arrangement of battery charging terminals and communication signal terminals, and wherein said multi-conductor connector is mounted at a location on said craft unit, such that said first and second sets of connector terminals of said multi-conductor connector are aligned with and engage said arrangement of battery charging terminals and communication signal terminals, when said craft unit is coupled with said storage and charging station.

23. An electrical interface according to claim 22, wherein said storage and charging station has a generally cup-like receiving portion, in which said arrangement of battery charging terminals and communication signal terminals is provided, and wherein said multi-conductor connector is mounted at a bottom portion of said craft unit, such that said first and second sets of connector terminals of said multi-conductor connector are aligned with and engage said arrangement of battery charging terminals and communication signal terminals, when said craft unit is placed into said generally cup-like receiving portion of said storage and charging station.

24. An electrical interface according to claim 22, wherein said arrangement of battery charging terminals and communication signal terminals of said storage and charging station comprises a plurality of male connector pins supported within said craft unit-receiving cup-like portion of said storage and battery-charging station, and wherein said bottom portion of said craft unit includes a generally rectilinear arrangement of recessed regions, which provide access to said multi-conductor connector, said multi-conductor connector comprising a multi-pin female terminal lead arrangement that mate with corresponding ones of said male connector pins supported within said craft unit-receiving cup-like portion of said storage and battery-charging station.

25. An electrical interface according to claim 21, wherein said plurality of male connector pins supported within said craft unit-receiving cup-like portion of said storage and battery-charging station contains a first set of communication signalling pins and a second set of battery-charging terminal pins through which the internal battery pack of said craft unit is charged.

26. An electrical interface according to claim 21, wherein said plurality of male connector pins supported within said craft unit-receiving cup-like portion of said storage and battery-charging station are supported so as to project vertically through a floor portion of said craft unit-receiving cup-like portion and are arranged so as to locate, align and make contact with respective ones of the linear arrangement of female connector terminals supported within the recessed regions of said craft unit, and thereby provide a charging current path from a charging power supply to which said storage and battery-charging station is connected, and a communication link to and external device.

27. An electrical interface according to claim 22, wherein said storage and battery-charging station further includes a battery charging well having a plurality of terminals which retain and charge a spare craft unit battery inserted into said battery charging well.

28. A method according to claim 1, wherein said communication signaling leads comprise digital communication signalling leads.

29. A method according to claim 28, wherein step (b) comprises interconnecting respective ones of both of said telephone signalling leads and said digital communication signalling leads to respective conductors of said multi-conductor sealed connector.

30. A method according to claim 1, wherein step (b) comprises interconnecting respective ones of both of said telephone signalling leads and said communication signalling leads to respective conductors of said multi-conductor sealed connector.

31. A method according to claim 3, wherein said communication signalling leads comprise digital communication signalling leads.

32. A method according to claim 5, wherein said communication signalling leads comprise digital communication signalling leads.

33. A method according to claim 6, wherein said communication signal terminals comprise digital communication signal terminals.

34. A method according to claim 8, wherein said communication signalling leads comprise digital communication signalling leads.

35. An electrical interface according to claim 11, wherein said communication signalling leads comprise digital communication signalling leads.

36. An electrical interface according to claim 11, wherein said interconnections are provided from respective ones of both of said telephone signalling leads and said communication signalling leads of said craft unit to respective conductors of said multi-conductor sealed connector.

37. An electrical interface according to claim 36, wherein said communication signalling leads comprise digital communication signalling leads.

38. An electrical interface according to claim 21, wherein said communication signalling leads comprise digital communication signalling leads.

39. An electrical interface according to claim 22, wherein said communication signal terminals comprise digital communication signal terminals.

* * * * *